(12) United States Patent
Göttel

(10) Patent No.: US 6,533,283 B1
(45) Date of Patent: Mar. 18, 2003

(54) CYLINDER HEAD GASKET

(75) Inventor: Ralf Göttel, Neu-Ulm (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 0 days.

(21) Appl. No.: 09/531,870

(22) Filed: Mar. 21, 2000

(30) Foreign Application Priority Data

Mar. 23, 1999 (DE) .......................... 199 13 092

(51) Int. Cl.[7] .............................. F16J 15/00; F16J 15/14; F02F 11/00; F16B 21/00
(52) U.S. Cl. .................. 277/317; 277/590; 277/591; 403/326
(58) Field of Search .............................. 277/317, 919, 277/590, 591, 592, 593, 594, 595, 596, 597, 598; 403/326, 329

(56) References Cited

U.S. PATENT DOCUMENTS

| | | | |
|---|---|---|---|
| 4,364,226 A | * | 12/1982 | Croset et al. |
| 4,397,176 A | * | 8/1983 | Rohde et al. |
| 5,046,466 A | * | 9/1991 | Lipski |
| 5,066,023 A | * | 11/1991 | Ma |
| 5,121,929 A | * | 6/1992 | Cobb |
| 5,195,365 A | * | 3/1993 | Chujo et al. |
| 5,380,014 A | * | 1/1995 | Schaperkotter |
| 5,659,132 A | * | 8/1997 | Novak et al. |
| 5,877,425 A | * | 3/1999 | Suzuki et al. |

FOREIGN PATENT DOCUMENTS

| | | |
|---|---|---|
| DE | 40 14 502 | 11/1991 |
| DE | 43 11 838 | 2/1995 |
| DE | 691 06 081 | 2/1995 |
| DE | 195 47 313 | 6/1997 |
| DE | 198 23 594 | 12/1998 |
| EP | 0 482 164 | 1/1995 |
| JP | 402157631 A | * 6/1990 |
| JP | 9-329520 | * 8/1996 |

* cited by examiner

*Primary Examiner*—Anthony Knight
*Assistant Examiner*—Vishal Patel
(74) *Attorney, Agent, or Firm*—Leydig, Voit & Mayer, Ltd.

(57) ABSTRACT

The invention concerns a cylinder head gasket of an internal combustion engine with a gasket sheet that contains at least one combustion chamber passage opening and a sensor device for the registration of a measurement value that depends on the operating condition of the internal combustion engine, wherein the arrangement of the gasket sheet features a connecting section for the detachable attachment of a sensor module of the sensor device and a measurement value registration position for the retention of a sensor element of a sensor module. The measurement value registration position can be a contact point near of the connecting section. However, it can also be located at a distance from the connecting section.

13 Claims, 4 Drawing Sheets

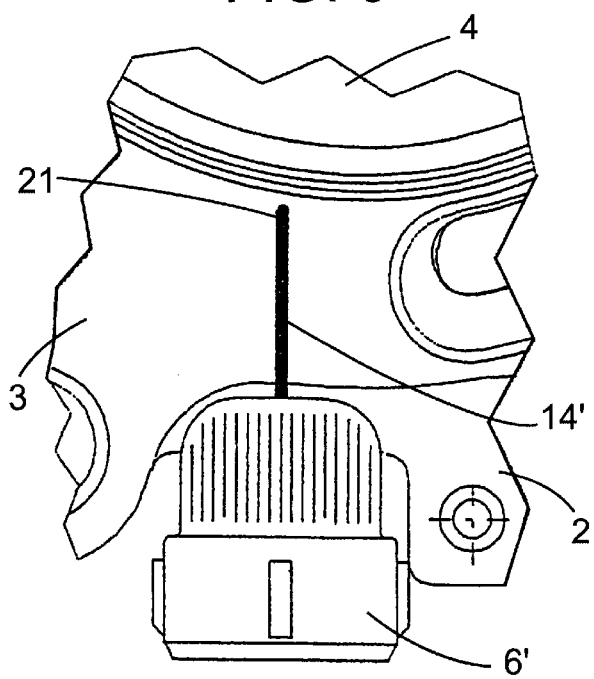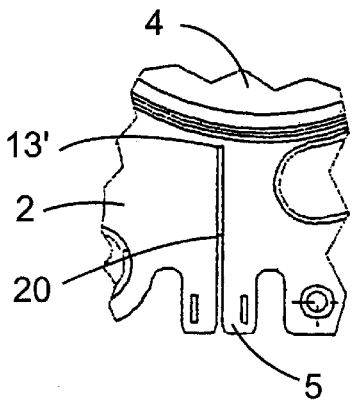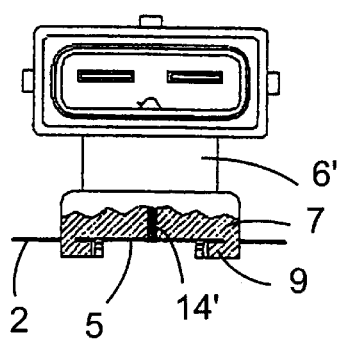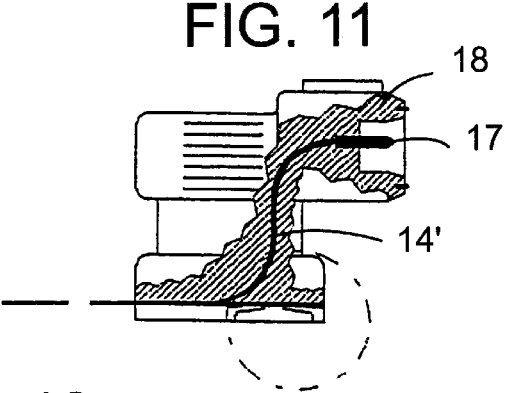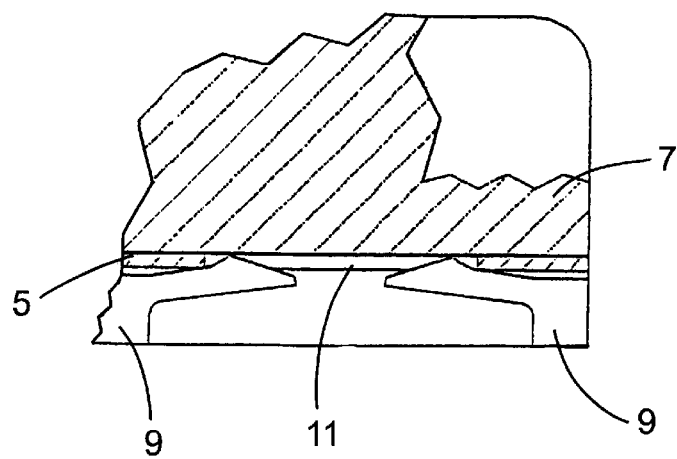

CYLINDER HEAD GASKET

RELATED APPLICATIONS

Figure 1:
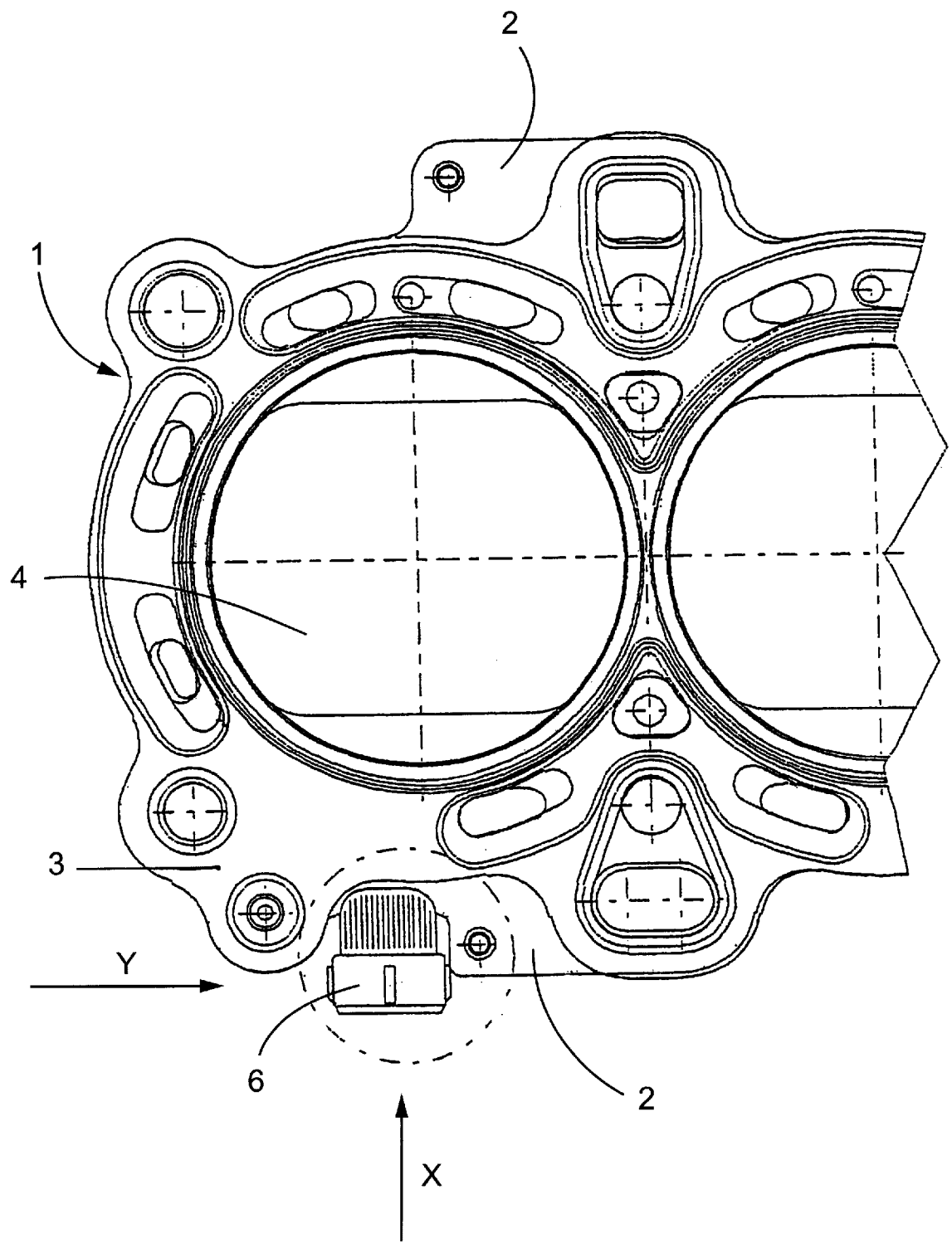

This application claims the benefit of German Application Serial No. 199 13 092.2, filed Mar. 23, 1999.

BACKGROUND OF THE INVENTION

The invention concerns a cylinder head gasket of an internal combustion engine with a gasket sheet that contains at least one combustion chamber passage opening, wherein on the gasket sheet there is a sensor device for the registration of a measurement value that depends on the operating condition of the internal combustion engine.

Such a cylinder head gasket of an internal combustion engine is known from EP 0 482 164 B1. The gasket sheet features a sensor device with several sensor elements, which are each fixed to the combustion chamber passage openings near the combustion chamber borders or combustion chamber sealing elements, e.g. glued into recesses that are press-molded into the bottom side of the gasket sheet. The sensor elements can be connected to a control unit and a monitoring unit by means of connecting lines and contact elements. The sensor elements measure movements of the sealing gap between the engine block and the cylinder head perpendicular to the plane of the gasket sheet that are caused by pressure changes in the corresponding combustion chamber area. Replacing a defective sensor element requires removal of the cylinder head gasket.

From DE 691 06 081 T2 a cylinder head gasket of an internal combustion engine has become known that features a gasket sheet with at least one combustion chamber passage opening, wherein a pressure sensor is attached to the gasket sheet for the purpose of registering the combustion pressure inside the combustion chamber of the internal combustion engine. The pressure sensor is located in the cylinder head gasket near the combustion chamber and is pressurized by the combustion pressure via a pressure channel. A connecting line passes through the cylinder head gasket to a connecting element located on the external edge of the gasket.

From DE 198 23 594 A1 a device is known for the optical registration of knocking phenomena during the combustion process of internal combustion engines that features an integrated light guide that connects the combustion chamber optically to an evaluation unit.

DE 195 47 313 A1 describes a device for measuring the distance or the movement between two engine parts separated by a gasket, e g. between the engine block and the cylinder head of the internal combustion engine. At least one capacitive and/or inductive impedance element is embedded in the gasket, which consists of at least partially non-metallic material, that any change in the distance of the engine part will result in a change of the impedance value of the impedance element, which permits the change in impedance to be used to determine the distance or the movement.

In DE 43 11 838 A1 a cylinder head gasket with a piezoelectric sensor for the registration of pressure vibrations is described. A piezo-element of the sensor is retained in a housing, which is deformable in thickness, inside the cylinder head gasket and abuts a housing wall, which lies against a sealing surface of the engine block or cylinder head sealing surface that is adjacent to the cylinder head gasket. An electrical contact can be established by means of a contact tongue.

DE 40 14 502 C2 discloses a process for the installation of a sensor into a compression-molded gasket, in particular a cylinder head gasket. In this process the sensor is inserted into the gasket material prior to compression and then the gasket is compressed.

The invention is based on the task of further developing generic cylinder head gaskets in such a way that defective sensor elements can be replaced without excessive disassembly and assembly work.

The task is realized for the above mentioned generic cylinder head gasket in that the gasket sheet features a connecting section for the detachable attachment of a sensor module of the sensor device and a measurement value registration position for the attachment of a sensor element of the sensor module. By means of this configuration, a sensor module with a sensor element can be installed and, if needed, it can be replaced after assembly of the cylinder head gasket without having to remove and replace the cylinder head gasket or to remove the sensor element to be replaced from its permanent fixed position, which could result in damage to the position holding the sensor element. The measurement value registration position can be near the connecting section or distant from it and if the connecting section is accordingly positioned on the gasket sheet, several measurement value registration positions can be assigned to one connecting section and thus to one sensor module. The sensor element can be coupled through direct mechanical contact to the gasket sheet or to components adjacent to the gasket sheet at the measurement value registration position. On the other hand, a corresponding sensor element could feature contactless coupling. The sensor module can be connected, via a pluggable cable, to a monitoring and control device or with a motor control.

Advantageous embodiments of the invention are indicated in the subordinate claims.

It is useful to configure the measurement value registration position as a contact point near the connecting section so that a sensor element contained in or integrated into the sensor module registers the measurement value to be registered near the connecting section.

On the other hand, the measurement value registration position can also be positioned at a distance from the connecting section. This permits the registration of measurement values at any point on the cylinder head gasket that are characteristic of the combustion process. The registered measurement value is transferred to the sensor element of the sensor module via a transfer line.

A transfer line can be configured so that the gasket sheet features a recess that extends from the connecting section to the measurement value registration position, wherein the sensor element is adapted to and retained by the recess. The sensor can be attached to the tip of an elongated carrier element that fits into the recess and can thus be positioned at the desired measurement value registration position, even if the sensor module is distant from the measurement value registration position.

The measurement value registration position can be positioned adjacent to the combustion chamber passage opening, adjacent to a cooling fluid passage opening or adjacent to an oil passage opening in order to register the temperature in these locations.

The connecting section is usefully configured at a border area of the gasket sheet that is accessible when the gasket is installed and configured as a plug-in connection for the sensor module. The plugged-in sensor module can be fixed in its place by a threaded connection, through snap clamps or other fastening devices so that it cannot become disconnected from the connecting section due to vibration during the operation of the engine.

The sensor element can be a displacement measuring system wherein movements within the cylinder head gasket as well as movements, which are caused, e.g., by pressure variations in the combustion chamber during engine operation, of the engine components adjacent to the cylinder head gasket, such as, e.g., engine block and cylinder head, can be measured. The sensor element can also be a thermal element that registers the temperature of the gasket sheet at the location of the measurement value registration position, such as e.g. near the combustion chamber or near a passage opening for cooling fluid or oil. As sensor elements, furthermore, force, pressure, elongation or acceleration measuring elements can be used that can be configured as wire strain gauges, piezoelectric, piezoresistive, capacitive, magnetic, electromagnetic or eddy current sensors or also as light guide sensors and micro-mechanical sensors.

The sensor module may feature several identical or similar sensor elements that can be correlated with one or more combustion chamber(s). On the other hand the sensor module may also, in connection with measurement value registration positions, feature differing sensor elements in a desired arrangement.

If the gasket sheet consists of several layers, one of these layers can be prepared for the registration of measurement values. Thus, e.g., a sensor element can be integrated into one layer, wherein the registered measurement value is transmitted via a line inside this layer to the connecting section of the sensor module where it is registered by the sensor element of the sensor module. The above-described recess for a sensor element can be integrated into such a layer of the gasket sheet.

Figure 3:
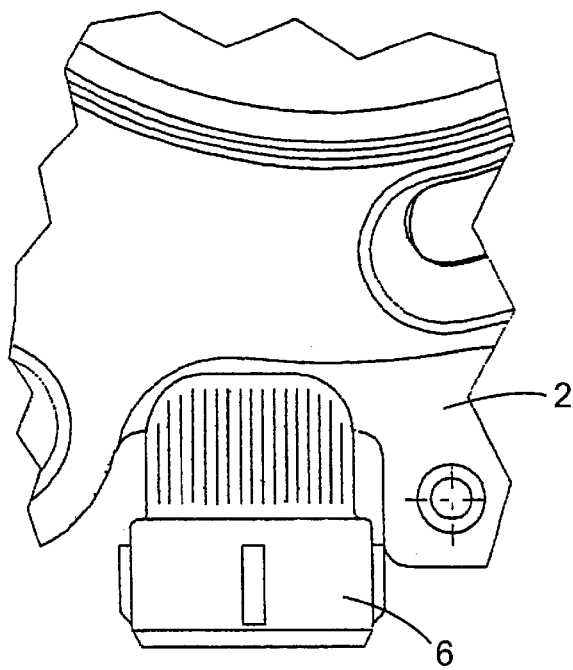
Figure 2:
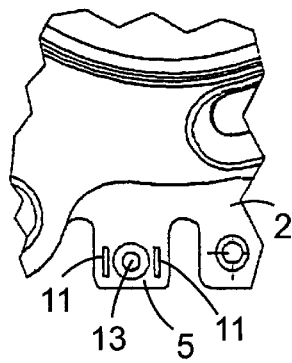
Figure 4:
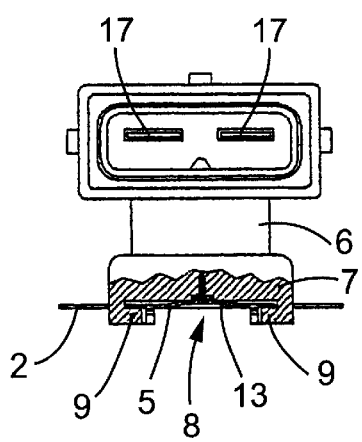
Figure 5:
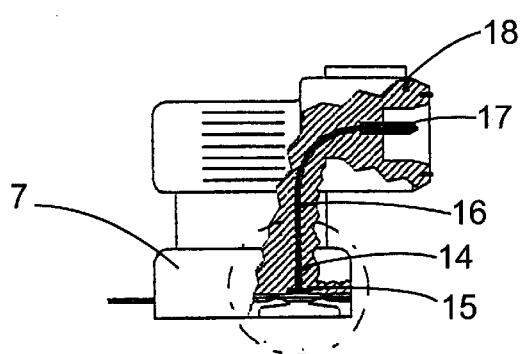
Figure 6:
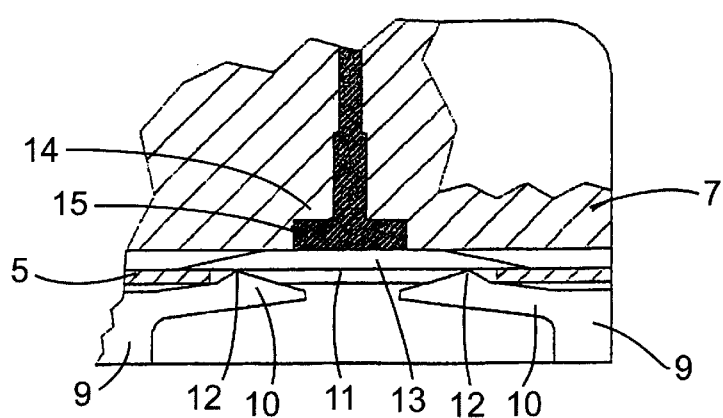
Figure 7:
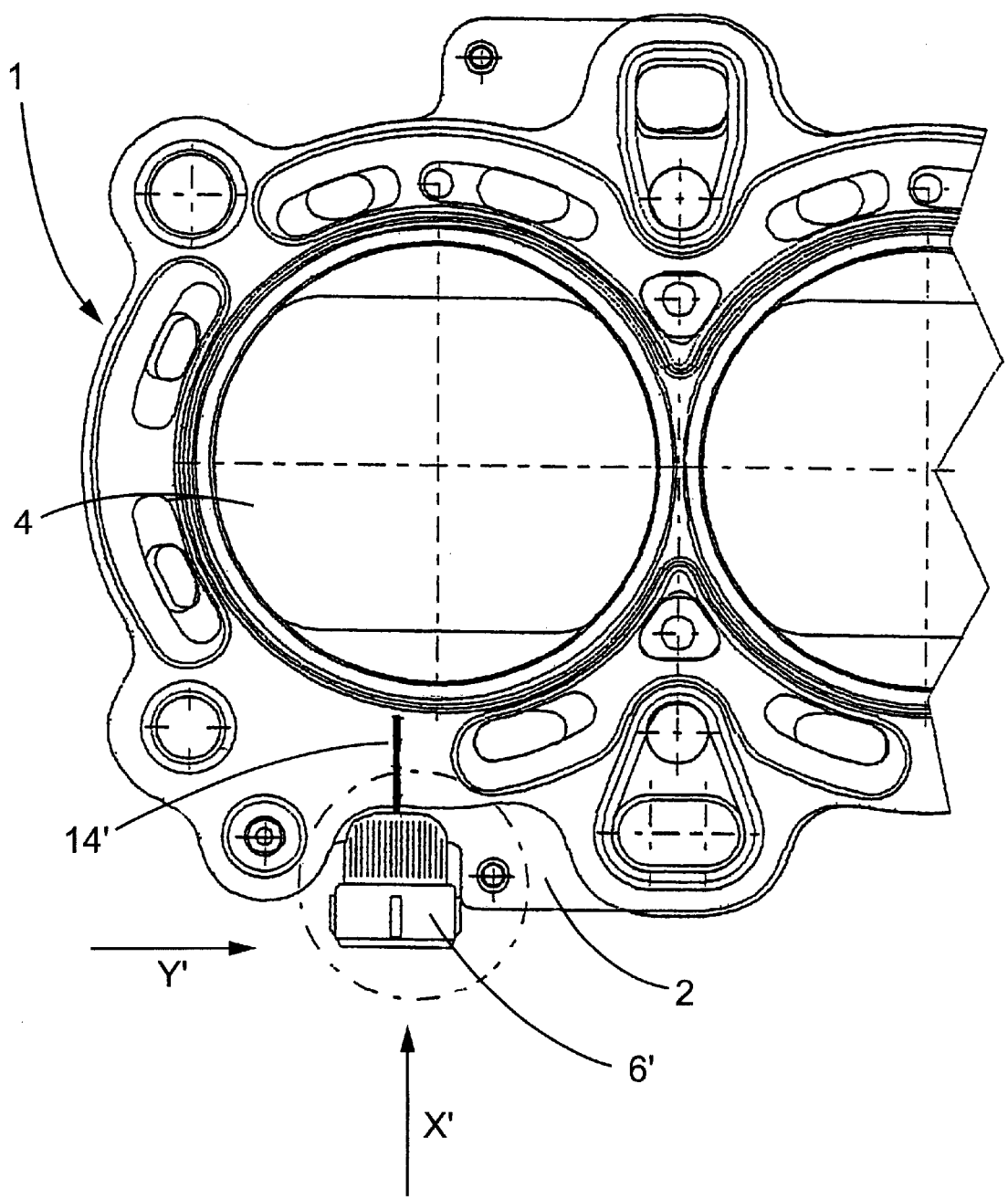

Below, the invention is more closely described based on embodiment examples and in reference to drawings. Shown are:

FIG. 1 a partial top view of a cylinder head gasket according to the invention with a sensor module;

FIG. 2 a partial top view of a gasket sheet of a cylinder head gasket with a connecting section for a sensor module;

FIG. 3 an enlarged side view according to FIG. 1 of the sensor module located at the gasket sheet;

FIG. 4 front view viewed in the direction of arrow X in FIG. 1 of the sensor module (partially cut away) located at the gasket sheet;

FIG. 5 side view according to the direction of arrow Y in FIG. 1 of the sensor module (partially cut away) located at the gasket sheet;

FIG. 6 side view according to FIG. 5 of the sensor module (enlarged and partially cut away) located at the gasket sheet;

FIG. 7 partial top view of a second embodiment example of a cylinder head gasket according to the invention with a sensor module;

FIG. 8 partial top view of the gasket sheet of the cylinder head gasket with a connecting section for a sensor module;

FIG. 9 enlarged side view according to FIG. 7 of the sensor module located at the gasket sheet;

FIG. 10 front view in the direction of the arrow X' in FIG. 1 the sensor module (partially cut away) located at the gasket sheet;

FIG. 11 side view in the direction of the arrow Y' in FIG. 1 of the sensor module (partially cut away) located at the gasket sheet;

FIG. 12 side view according to FIG. 11 of the sensor module (enlarged and partially cut away) located at the gasket sheet.

A cylinder head gasket 1, shown partially in FIG. 1 (see FIG. 1), features a gasket sheet 2 that is also called a carrier sheet. On the top side and/or the bottom side of the gasket sheet 2, additional gasket sheets can be located in a known fashion, such as, e.g., the upper gasket sheet 3 shown in the drawing, in order to build a multi-layer cylinder head gasket 1. In this type of design both the gasket sheet 2 and the other gasket sheets can feature ribbing and stoppers for the sealing of passage openings 4 for corresponding combustion chambers of the internal combustion engine.

The gasket sheet 2 features a connecting section 5 (see FIG. 2) to which a sensor module 6 can be attached by plugging the sensor into the section (see the enlarged views of the FIGS. 3 through 6). The shown connecting section 5 is configured in the shape of a tongue at one free edge of the gasket sheet 2. The sensor module 6 features a socket 7 with a slit-shaped receptacle opening 8, which has a shape adapted to fit the tongue-shaped connecting section 5. The connecting section also features retaining fingers 9 that grip around the inserted connecting section 5 with elastic snap clamps 10 that have a corresponding retaining protrusion 12 that engage in two recesses 11 of the connecting section 5 when the sensor module 6 is positioned in its snap-locked and operating position on the gasket sheet 2. The gasket sheet 2 features, between the two recesses 11 on the connecting section 5, a measurement value registration position 13 in the form of bump that is formed toward the top side of the gasket sheet 2 and that is manufactured as a circular surface by means of stamping the gasket sheet 2. The sensor module 6 contains as a sensor element a thermal element 14 that is positioned in the retaining opening 8 in such a manner that a contact zone 15 of the thermal element 14 abuts directly against the measurement value registration position 13 when the sensor module 6 is positioned in its operating position on the gasket sheet 2 as shown in FIGS. 3 through 6. A connecting line 16 that is integrated into the sensor module 6 connects the contact zone 15 to two contact pins 17 of a connector element 18 of the sensor module 6 that is used to connect a line that is connected to a computer unit or to a motor control and monitoring unit.

The embodiment example of a cylinder head gasket that is shown in FIGS. 7 through 12 differs from the previously described cylinder head gasket in the configuration of the sensor module 6'. The connecting section 5 of this gasket sheet 2 features an elongated slit-shaped recess 20 that extends from the connecting section 5 to near the combustion chamber passage opening 4 and that defines a forward measurement value registration position 13'. The sensor module 6', which essentially has an identical structure as the sensor module 6 shown in FIGS. 1 through 6, contains a sensor element 14' with an extended mounting bracket that extends in a lance-shaped manner forward from the retaining opening 8 at the socket 7 and is inserted into the recess 20 when the sensor module 6' is attached, so that a measurement tip 21 of the sensor element 14', e.g. a thermal element, is positioned at the forward measurement value registration position 13'. In this manner the sensor module 6' can be connected to a distant measurement value registration position 13'.

The recess 20 contained in the gasket sheet 2 can be covered by a gasket sheet 3 that lies on the gasket sheet 2. However, a recess 21 can be provisioned in the gasket sheet 3 that has the same dimensions as the cover making a larger cross section available for the retention of the lance-shaped mounting device.

The sensor module 6 or 6' may also feature two or more identical or different sensor elements. For this purpose the connecting section features one measurement value registration position for direct contact with the sensor module and a distant measurement value registration position that is reached by means of a cable connection.

I claim:

1. A cylinder head gasket of an internal combustion engine comprising:

a gasket sheet having at least one combustion chamber passage opening;

a sensor device attached to the gasket sheet for registration of a measurement value that depends on an operating condition of the internal combustion engine, wherein the gasket sheet includes a connecting section for detachable attachment of a sensor module of the sensor device, the sensor module including at least one snap lock clamp, and wherein the connecting section is configured at a border area of the gasket sheet that is exposed when the cylinder head gasket is installed and is configured as a plug-in connection for the sensor module; and a measurement value registration position for retention of a sensor element of the sensor module.

2. A cylinder head gasket of an internal combustion engine comprising:

a gasket sheet having at least one combustion chamber passage opening;

a sensor device attached to the gasket sheet for registration of a measurement value that depends on an operating condition of the internal combustion engine, wherein the gasket sheet includes a connecting section for detachable attachment of a sensor module of the sensor device, and wherein the sensor module includes at least one snap-lock clamp; and a measurement value registration position for retention of a sensor element of the sensor module.

3. The cylinder head gasket according to claim 2 wherein the measurement value registration position is a contact point near the connecting section.

4. The cylinder head gasket according to claim 2 wherein the measurement value registration position is positioned at a distance from the connecting section.

5. The cylinder head gasket according to claim 4 wherein the gasket sheet includes a recess that extends from the connecting section to the measurement value registration position and retains the sensor element, which is adapted to fit the recess.

6. The cylinder head gasket according to claim 5 wherein the measurement value registration position is positioned adjacent to the combustion chamber passage opening or adjacent to a coolant fluid passage opening.

7. The cylinder head gasket according to claim 2 wherein the sensor element is a thermal element.

8. The cylinder head gasket according to claim 2 wherein the sensor element is a force, distance, pressure, elongation or acceleration measuring element.

9. The cylinder head gasket according to claim 2 wherein the sensor module includes at least two sensor elements.

10. The cylinder head gasket according to claim 9 wherein the at least two sensor elements are different sensor elements.

11. The cylinder head gasket according to claim 2 wherein the gasket sheet is formed from several layers and wherein at least one layer is prepared for measurement value registration.

12. The cylinder head gasket according to claim 11 wherein the recess for the sensor element is configured within a layer that has been prepared for measurement value registration.

13. The cylinder head gasket according to claim 2 wherein the sensor module is connected to a measurement value processing unit by means of a pluggable cable.

* * * * *